Jan. 20, 1942.　　　R. W. ALLEN　　　2,270,817
PRESS
Filed Dec. 21, 1938　　　5 Sheets-Sheet 1

Jan. 20, 1942.    R. W. ALLEN    2,270,817
PRESS
Filed Dec. 21, 1938    5 Sheets-Sheet 3

INVENTOR
RAYMOND W. ALLEN

BY

ATTORNEYS

Jan. 20, 1942.    R. W. ALLEN    2,270,817
PRESS
Filed Dec. 21, 1938    5 Sheets-Sheet 4

INVENTOR
RAYMOND W. ALLEN

BY

ATTORNEYS

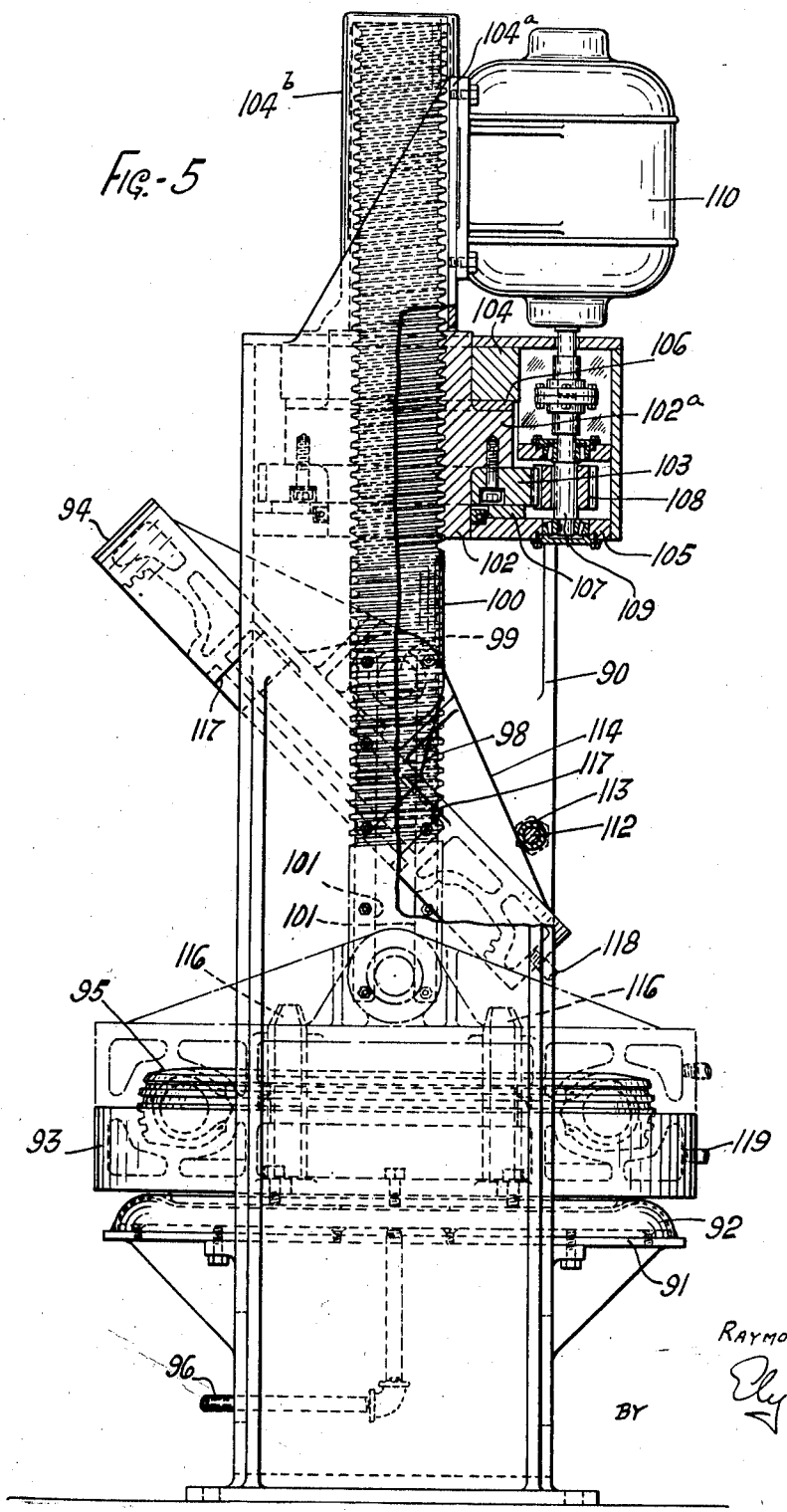

Patented Jan. 20, 1942

2,270,817

UNITED STATES PATENT OFFICE 2,270,817

PRESS

Raymond W. Allen, Akron, Ohio, assignor to The Firestone Tire & Rubber Company, Akron, Ohio, a corporation of Ohio Application December 21, 1938, Serial No. 247,003

10 Claims. (Cl. 18—17)

This invention relates to presses, and more especially it relates to vulcanizing presses such as commonly are used in the rubber industry for the vulcanization of pneumatic tire casings, inner tubes, and mechanical rubber goods.

In presses of the character mentioned, it is common practice to attach separable mating mold sections to the respective heads of the press, the mold sections being heated either by means of steam jackets constituting a part of each section, or by heating the press-heads. It is also common practice to soap or otherwise lubricate the molding cavity or cavities of the upper mold section so that when the press is opened the work will remain in the lower mold section. For convenience in soaping the upper mold section, and to facilitate the removal of finished work from the lower mold section, and the mounting of new work therein, it is desirable that in the open position of the press the mold sections be presented to the operator of the press in tilted or oblique position, and it is to improvements in this type of press that this invention primarily is directed.

The chief objects of the invention are to provide in an improved manner for the tilting of the press heads of a vulcanizing press; to provide screw-operated closure means for tilting-head presses; to provide simple and efficient means whereby the tilting of one press head will effect the tilting of the other press head; and to provide for the tilting of the press heads independently of the mechanism that effects the opening and closing of the press. Other objects will be manifest as the specification proceeds.

Of the accompanying drawings:

Figure 5 is a side elevation of another embodiment of the invention, a part thereof being broken away and in section.

Figure 1:
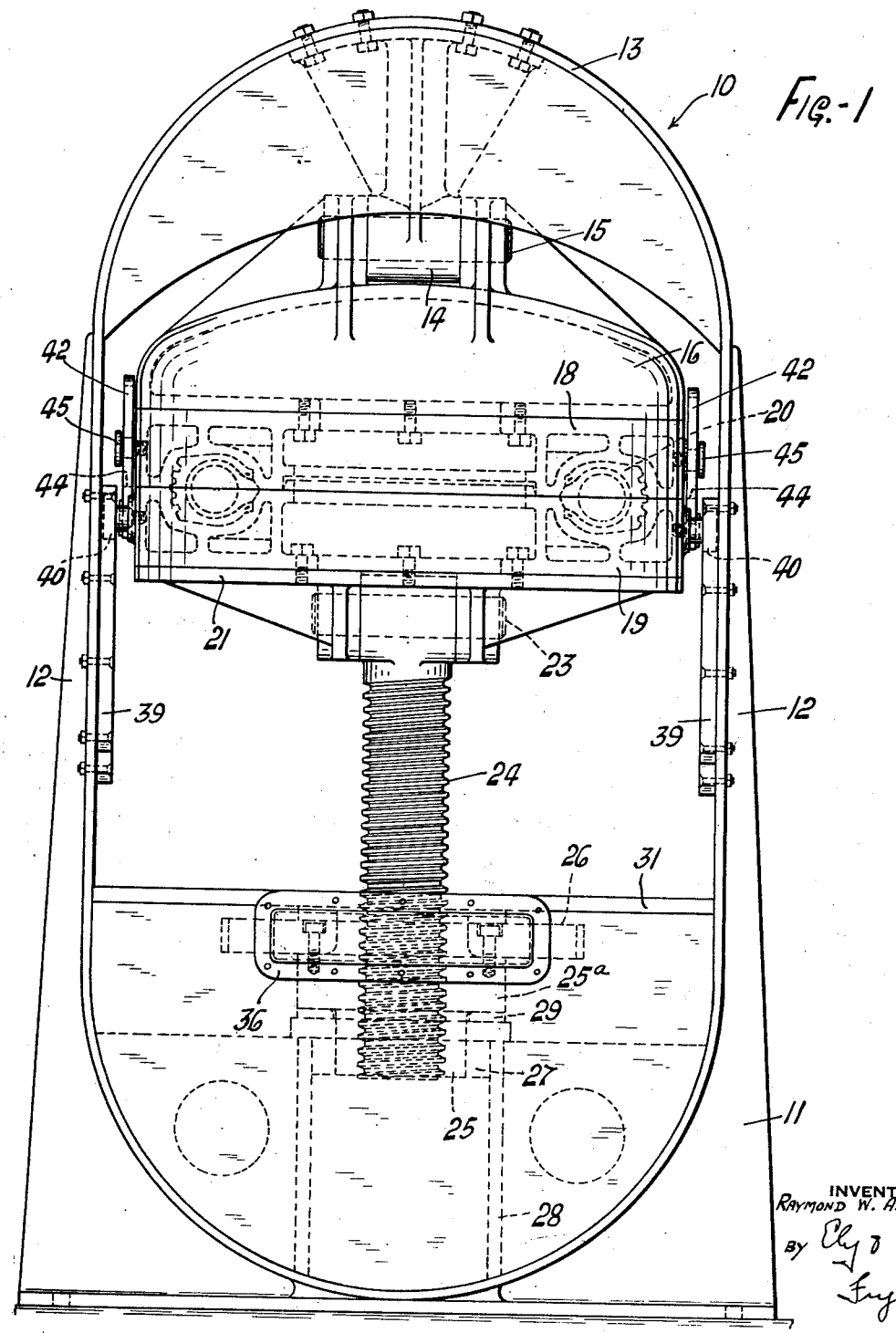
Figure 1 is a front elevation of a press constituting one embodiment of the invention, said press being in its closed or operative position.
Figure 2:
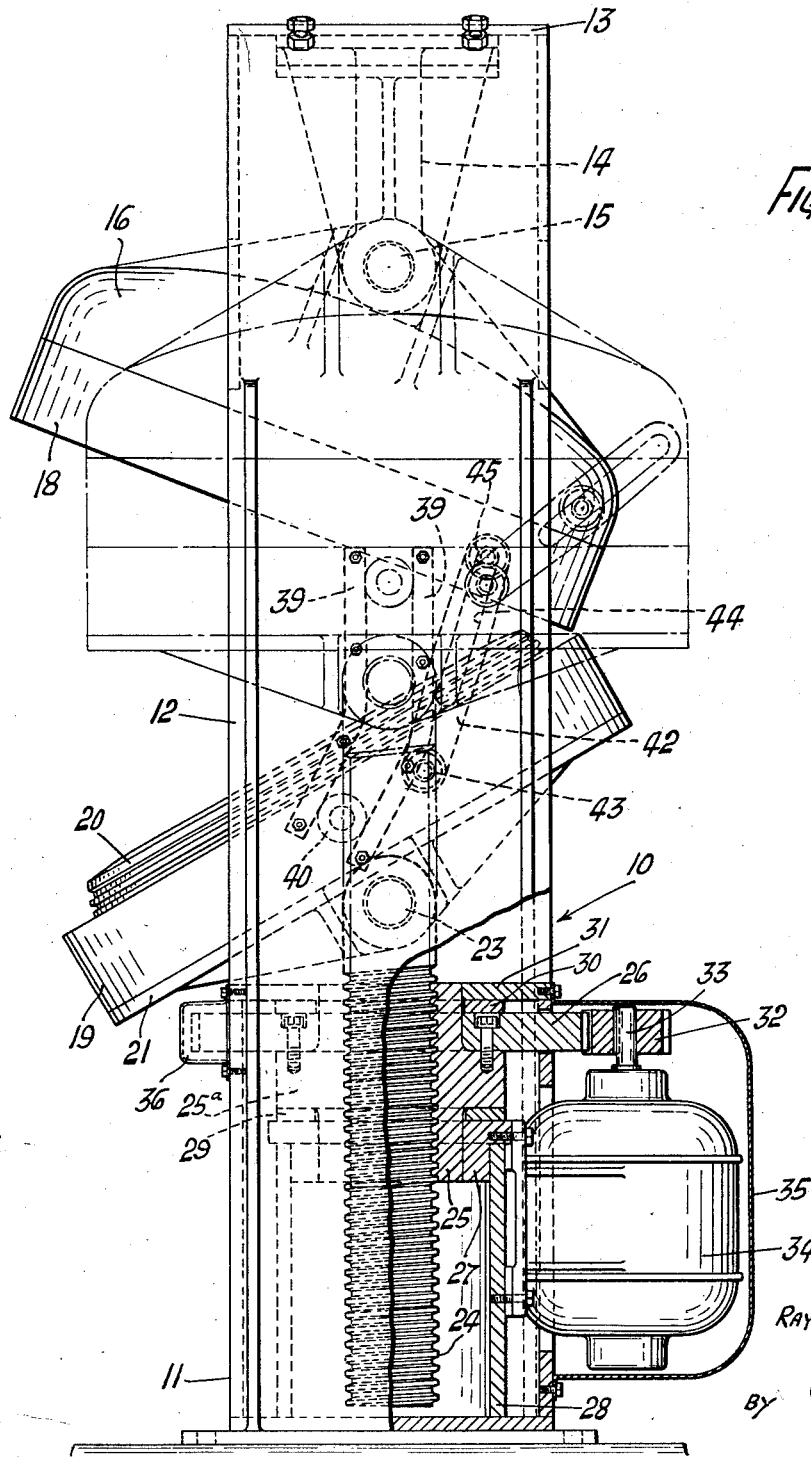
Figure 2 is a side elevation, partly broken away and in section, of the press shown in Figure 1, as viewed from the right thereof, in the open position of the press, the closed position thereof being indicated in broken lines.

Referring now to Figures 1 and 2 of the drawings, there is shown a press frame generally designated 10, which frame is a unitary structure comprising a base portion 11, upright, spaced-apart side portions 12, 12, and an arched top 13 extending from one side portion 12 to the other. Mounted upon the under or concave side of the top 13, centrally thereof, is a bearing bracket 14 that carries a horizontal pivot pin 15, the latter being disposed transversely with relation to the frame 10. Pivotally mounted upon the pin 15 is the upper head 16 of the press, the pin being disposed diametrically with relation to the head.

Secured to the under side of head 16 is the upper section 18 of a two part, steam jacketed vulcanizing mold of which the lower mating section is designated 19. As shown, the mold is annular and includes an annular cavity in which a pneumatic tire casing 20 may be molded and vulcanized. The lower mold section 19 is mounted upon a lower press head 21, which press head is arranged to be moved vertically to effect opening and closing of the press, and is pivotally mounted to enable it to tilt in a manner that facilitates the emptying and loading of the press.

To this end the said lower press head 21 is pivotally supported upon a hinge pin 23, the latter being disposed parallel to the hinge pin 15 of the upper press head, and in the same vertical plane as the pin 15. The pin 23 is carried by the upper end of a screw-threaded, non-rotatable post or stem 24, which stem is threaded through a nut 25, the latter having a relatively larger gear 26 secured to the upper lateral face of a circumferential flange 25a formed thereon. The nut 25 is journaled in a supporting structure 27 that is mounted atop of a tubular structure 28 positioned within the base 11, there being a bearing 29 disposed between the nut-flange 25a and the top of supporting structure 27. A second bearing 30 is positioned between the top of gear 26 and an overlying cap plate 31. The gear 26 is meshed with a driving pinion 32 that is mounted upon the vertically disposed shaft 33 of a reversible electric motor 34, the latter being bolted or otherwise secured to the tubular structure 28 at the rear of the press. The arrangement is such that the driving of the motor 34 in either direction will rotate the nut 25 on its axis, with the result that the screw or stem 24 will be caused to move axially and thereby to raise or lower the press head 21 and mold section 19 thereon. A sheet metal guard or casing 35 may be provided for enclosing the motor 34 and pinion 32. At the front of the press a metal guard 36 is provided for covering a projecting portion of the gear 26.

For effecting a tilting of the lower press head 21 and mold section 19 thereon as the same are moved vertically between open and closed positions, the inner or confronting faces of side portions 12 of frame 10 are provided with respective centrally positioned guide or cam surfaces, each of which consists of a pair of parallel, spaced-apart, tracks or rails 39, 39. Swiveled at diametrically opposite sides of the lower mold section 19 are respective cam rollers 40, 40, which rollers are positioned in the space between the rails 39 at each side of the press, substantially in contact with each rail. The upper end portions of the rails 39 are vertically disposed, whereas the lower end portions thereof are obliquely disposed at an angle with relation to said vertical portions, said angle being such that the lower end portions of the rails extend toward the front of the press. The cam rollers 40 are positioned somewhat above the pivot pin 23, the arrangement being such that when the cam rollers are engaged with the vertical, upper portions of the tracks 39 the lower press head 21 and mold section 19 thereon are horizontally disposed. When the cam rollers are engaged with the oblique portions of the tracks 39, which occurs when the press head 21 is in lowered position to open the press, said press head and mold section thereon are in the tilted position shown in full lines in Figure 2, with the rear portion of the mold section tilted upwardly and forwardly to facilitate the removal of finished work therefrom.

The tracks 39 are so arranged that the lower mold section moves in a rectilinear course in its initial movement away from upper press head 18 and in its final closing movement toward said upper press head, which arrangement is advantageous in that pinching or displacing of the work in the mold, during the closing of the mold, is avoided. The rectilinear and angular movements of the lower mold section are utilized for effecting a tilting movement of the upper mold section 18 and upper press head 16 in the open position of the press, which tilting movement lowers the rear of the mold section and elevates the front thereof to give greater accessibility for the cleaning and lubricating of the molding cavity. To this end links 42, 42 are pivotally connected at 43 to the lower mold section, on opposite sides thereof and somewhat rearwardly of the cam rollers 40 thereon. The end portions of links 42, remote from pivots 43, are formed with respective lost motion slots 44, in which slots are received respective headed pins or studs 45 that project from the upper mold section 18, rearwardly of the transverse diametric plane thereof.

The arrangement is such that the lower mold section 19 has a substantial range of movement from and toward the upper mold section 18 during which the links 42 slide relatively of the pins 45 by reason of the lost motion slots 44 in said links. During such movement the lower press head is in horizontal position because of the vertical arrangement of the tracks 39 with which the cam rollers 40 are engaged, and the upper press head is in horizontal position because its center of gravity is in the vertical plane of its diametrically disposed pivot pin 15, from which pin the mold section and upper head 16 are suspended. During the opening of the press, the cam rollers 40 reach the lower end of the vertical portions of tracks 39 at about the same time that the lost motion of the links 42 is taken up and further movement thereof relatively of the pins or studs 45 is prevented. Thereafter as the downwardly moving post 24 continues to lower press head 21 and mold section 19, the cam rollers 40 of the latter move into the oblique cam-ways defined by the tracks 39, with the result that the mold section and press head are tilted angularly about pivot pin 23 from horizontal position to an oblique position, as shown in Figure 2, with the rear of the mold section elevated and its front depressed. The downward and the tilting movements of the lower mold section 19, by reason of the connecting links 42 transmit a force or pull to the studs 45 of the upper mold section 18 that effects a tilting of the latter and the press head 16 about the pivot pin 15, the rear of the mold section being depressed and the front thereof elevated. In this condition of the press the mold readily is loaded and unloaded. In the closing of the press the motions described are reversed.

It will be seen that in the initial opening movement of the press and in the final closing thereof the mold sections are in parallelism, the lower press head and mold section having rectilinear movement relatively of the upper press head and mold section. Angular movement of the lower mold section, which tilts it out of a horizontal plane, is utilized for effecting similar movement of the upper mold section and press head, thus making for simplicity of construction in that no individual power means is required for tilting the upper members. The feature of having the lower press head pivotally mounted upon a power member having a fixed situs also simplifies the construction and operation of the press.

Figure 3:
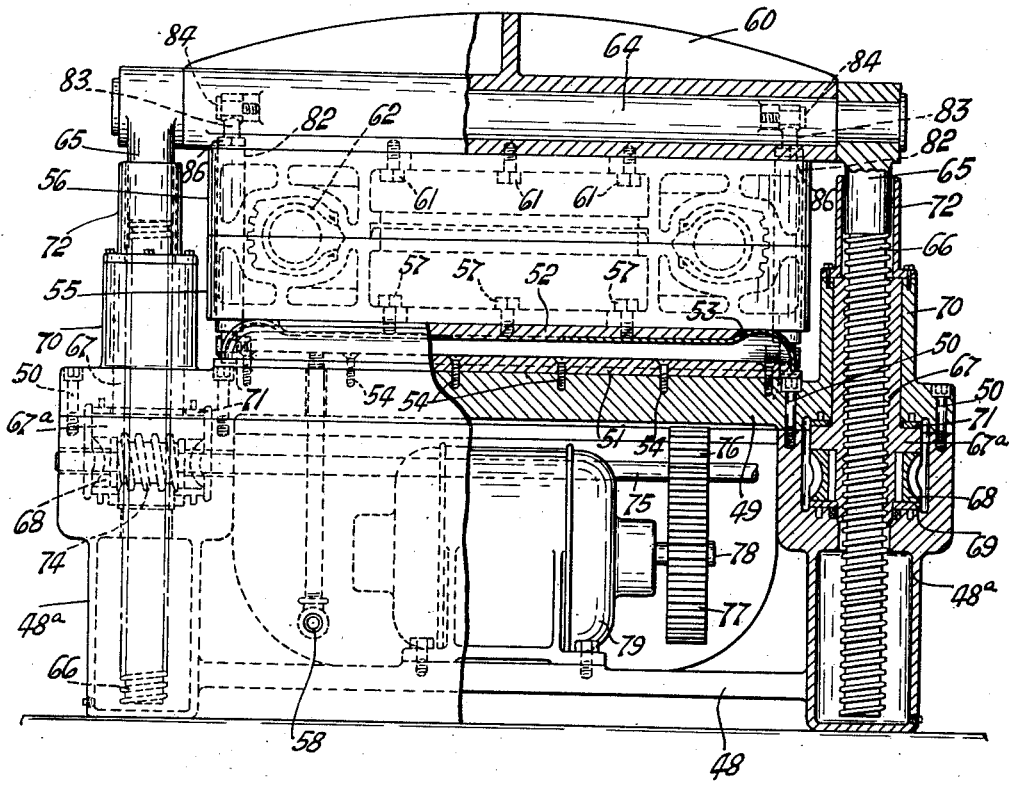
Figure 3 is a front elevation of a press constituting another embodiment of the invention, parts being broken away and in section.
Figure 4:
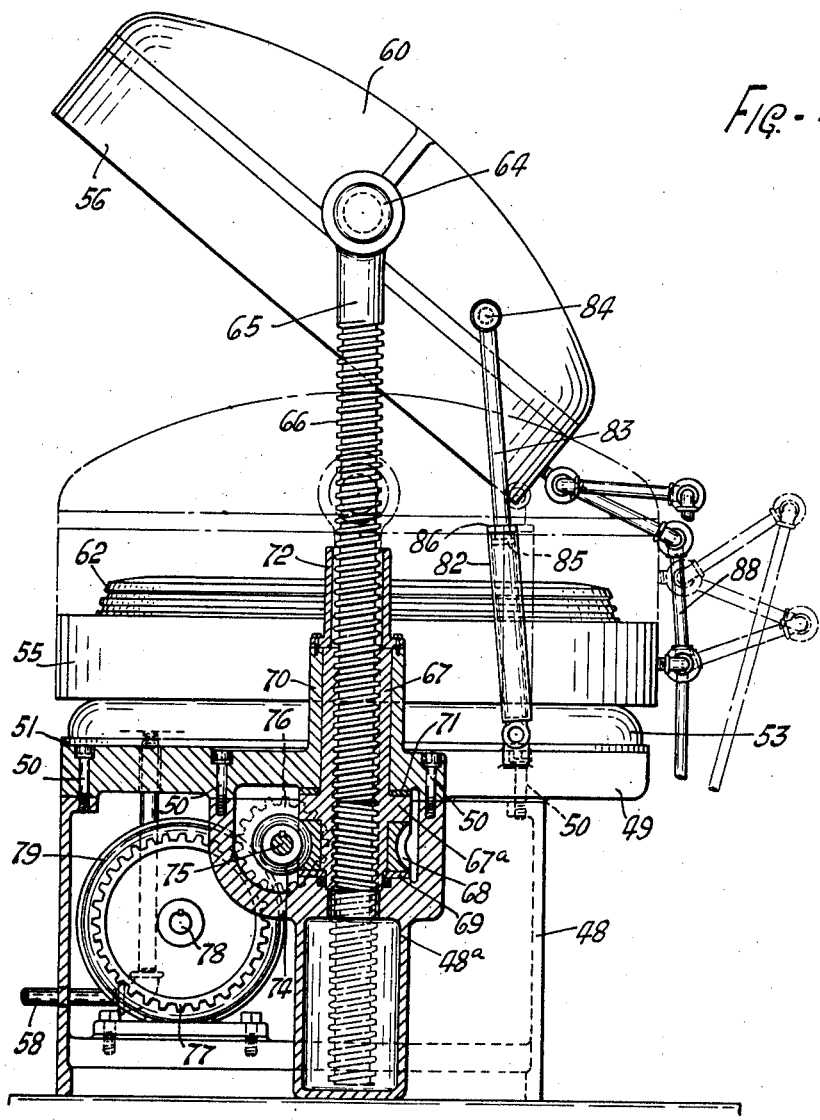
Figure 4 is a side elevation of the press shown in Figure 3, in the open position of the press.

Referring now to the embodiment of the invention shown in Figures 3 and 4 of the drawings, there is shown a press of which 48 designates generally a box-like base casting that is surmounted by a relatively large stationary, horizontal platen or cap-plate 49 secured thereto by cap-screws 50, 50. Mounted upon the top of cap-plate 49 is a circular, expansible diaphragm structure, which structure comprises a circular bottom plate 51, a circular top plate 52 of smaller diameter and concentric therewith, and a flexible, annular, metal diaphragm 53 connected at its inner and outer circumferences to the said top plate and bottom plate respectively. Preferably, said diaphragm 53 is of a suitable alloy, such as "Monel" metal, and it is secured to top plate 52 and bottom plate 51 by being welded thereto. Bottom plate 51 is secured to cap-plate 49 by means of cap-screws 54, 54. Mounted upon top plate 52, concentrically thereof, is the lower mold section 55 of a two-part, steam-jacketed, annular cavity mold, the upper section of which is designated 56. The lower mold section 55 extends beyond the margin of top plate 52 and overlies the perimeter of the diaphragm, the mold section being secured to the said top plate by cap-screws 57, 57. Hydraulic fluid pressure for expanding the diaphragm structure is supplied thereto through a pipe 58, the discharge end of which extends through cap-plate 49 and bottom plate 51, the other end of said pipe being located at a source of fluid pressure (not shown). Expansion of the diaphragm structure moves the top plate 52 in an axial direction, away from bottom plate 51, as is shown in Figure 3, thereby elevating lower mold section 55 thereon.

The upper mold section 56 is mounted upon the under side of a movable upper press head 60, being secured thereto by cap screws 61, 61. The press head 60 is movable relatively of the platen or cap-plate 49 to open or to close the mold, and such relative movement is in part a vertical, rectilinear movement of translation, and in part is an angular or tilting movement that lowers the rear of the mold section and tilts the front thereof. The mold as shown is a tire vulcanizing mold, a portion of a tire being shown at 62 therein. The rectilinear movement of the press head 60 occurs during the initial opening movement of the upper mold section and the final closing movement thereof, and during such movement the upper mold section 56 is in parallelism with lower mold section 55. The advantages of this arrangement previously have been set forth.

For raising and lowering the press head 60 in the manner described, said press head is swiveled upon a diametrically disposed pintle 64 that is arranged transversely of the press, the respective end portions of the pintle projecting laterally of the press head and being supported upon the upper end of respective vertical posts or stems 65. Each post 65 has the major portion of its length formed with a male screw thread 66 that is threaded through an elongated nut 67, the latter having a circumferential flange or collar 67ª formed integral therewith. Each nut 67 has a worm wheel 68 keyed thereto in abutting relation to the under side of flange 67ª, said worm wheel resting upon a thrust washer or bearing 69 that is suitably seated in a housing structure 48ª formed integral with the base casting 48. The cap-plate 49 is formed with upstanding tubular bearing portions 70, 70 in which the respective nuts 67 are journaled, there being a thrust bearing 71 positioned between the under side of the cap-plate and the top of each nut flange 67ª. A tubular cap 72 is mounted upon the top of each bearing portion 70, and overlies the upper end of the nut 67 thereat.

Meshed with the worm wheels 68 are respective worm gears 74 that are mounted upon opposite ends of a shaft 75, the latter extending transversely of the press and being journaled in the respective housing structures 48ª. Intermediate the worm gears 74 the shaft 75 has keyed thereto a spur gear 76 that is meshed with a relatively large gear 77 carried by the shaft 78 of a reversible electric motor 79, said motor being mounted inside the base casting 48. The arrangement is such that by the driving of motor 79, the posts 65 may be caused to move axially upwardly or downwardly and thereby to raise or lower the upper press head 60 to open or close the press. The upper press head 60 is balanced upon its diametric pintle 64 so that the upper mold section 56 will separate from the lower mold section 55, and also move into mating relation therewith, while it is in parallelism therewith. The advantages of this arrangement are well known and previously have been explained.

As in the previously described embodiment of the invention, it is desirable that the upper mold section be tilted out of a horizontal plane while the press is open, and to this end suitable mechanism is provided for effecting the tilting thereof. Said mechanism consists of a pair of telescoping links, which links are disposed on opposite sides of the press, rearwardly of the threaded posts 65, and connect the upper press head 60 with the cap-plate 49. As is best shown in Figure 4, each telescoping link comprises a tubular shell or sleeve 82 that is pivotally connected at its lower end to the cap-plate 49, said sleeve having a rod 83 slidably mounted for axial movement therein.

The outer end of rod 83 is pivotally connected at 84 to the upper press head 60, the other end of the rod being provided with an enlarged head 85 that prevents the rod from being entirely withdrawn from the sleeve 82 by reason of a gland 86 on the non-pivoted end of the latter, through which gland the rod 83 slidably extends. The arrangement constitutes a lost motion connection between the plate 49 and press head 60 that enables the two mold sections to maintain parallel relationship during the initial opening and final closing movements of the press, yet effects a tilting of the upper mold section in the fully open condition of the press. The telescoping links also exert a cushioning effect upon the upper press head and mold section during the closing of the mold.

As previously stated, the mold sections 55, 56 are steam jacketed to receive heated fluid, such as steam, whereby vulcanization of the article in the mold is accomplished. In Figure 4 there is shown at 88 a portion of the piping that is provided for supplying steam to the mold sections and for venting steam and condensate therefrom.

This embodiment of the invention includes substantially all of the desirable features of that previously described. It differs from the latter primarily in the feature of the expansible diaphragm structure which makes it possible tightly to close the mold sections without relying entirely upon the motor and screws for this purpose. Thus it is not required that the motor cease its rotation at a critical point, during the closing of the mold, and coasting or over-run of the motor is not of serious consequence, since it is the diaphragm structure that effects the final mold closing. The arrangement obviates jars and jolts such as occur in the usual screw-operated presses.

Referring now to the embodiment of the invention shown in Figure 5, there is shown a press comprising a frame 90, the base portion of which comprises a stationary horizontal head or platen 91, the top of the latter carrying a circular expansible diaphragm structure 92. The diaphragm structure supports the lower mold section 93 of a two-part cavity mold, the upper section of which is designated 94. The mold illustrated is a steam-jacketed tire mold, a portion of a pneumatic tire casing 95 being shown in the lower section 93 thereof. The diaphragm structure 92 is arranged to be distended by fluid pressure in an axial direction, for imparting a limited upward and downward movement to lower mold section 93, the pipe 96 being provided for conveying pressure fluid to and from said diaphragm structure.

The upper mold section is formed integrally with bearing brackets 98 by means of which it is swiveled upon a horizontal pintle pin 99 carried at the lower end of a vertically positioned post or stem 100, the latter being formed with screw threads throughout substantially its entire length. The pintle pin 99 is diametrically disposed with relation to the mold section 94, and its end portions are slidably received in respective vertical guide slots 101 on the adjacent opposite lateral faces of frame 90, the arrangement being such as to prevent rotary movement of the post 100. The post 100 is threaded through a nut 102 that is integrally formed with a circumferential flange or collar 102a, and attached to the lower face of said collar is a gear 103. The nut 102 is journaled in suitable bearing brackets 104, 105 that are carried at the top of the frame 90, there being a thrust bearing 106 interposed between upper bearing bracket 104 and flange 102a, and a thrust bearing 107 interposed between gear 103 and lower bearing bracket 105. The gear 103 is meshed with a driving pinion 108 mounted upon a vertical shaft 109 that is coupled to the shaft of a reversible electrically driven motor 110, the latter being mounted upon a suitable upstanding supporting structure 104a on the upper bearing bracket 104. Said structure 104a may also be formed with a tubular sleeve or guard structure 104b in which the post 100 is receivable when in elevated position. The arrangement is such that by driving the motor 110 in either direction the post 100 will be moved axially, upwardly or downwardly, to raise or lower the mold section 94.

Extending transversely of the press, rearwardly of the post 100 and somewhat above the lower or operative position of mold section 94, is a rod 112 that is secured to opposite sides of the press frame 90, and rotatably mounted upon said rod 112 is a tubular sleeve 113. The sleeve 113 is positioned in the path of the upper mold section 94, when the latter is being lifted, the arrangement being such that the mold section will engage said sleeve, rearwardly of its pintle pivot 99, with the result that continued rise of the mold section will tilt it to an oblique position with its front higher than its rear, as is shown in full lines in Figure 5. The top of the mold section 94 is provided with a pair of webs or ribs, such as the rib 114, for engaging the sleeve 113.

To assure that the upper mold section 94 always will register accurately with lower mold section 93 when lowered thereonto, said lower mold section is provided with two or more upstanding dowels 116, 116 that are receivable in respective recesses or bores 117 formed in the upper mold section. The mold sections 93, 94 are heated to vulcanizing temperature in the usual manner by steam that is conducted thereto by flexible conductor pipes, portions of the latter being shown at 118, 119.

This embodiment possesses all of the advantages inherent in the structure shown in Figures 3 and 4, but is of somewhat lighter construction, being designed for the manufacture of smaller sized tires.

Other modification may be resorted to without departing from the spirit of the invention, or the scope thereof as defined by the appended claims.

What is claimed is:

1. In a press of the character described, the combination of a pair of horizontally arranged annular mating mold sections, a power member having rectilinear movement exclusively in the direction normal to the parting plane of the mold, one of said mold sections being pivotally mounted upon a diametric axis upon an end of said power member, whereby movement of the latter effects opening and closing of the mold, and a lost motion connection between said one mold section and a fixed point on the press for tilting the mold section on its pivot at a determinate point during the opening of the press, said connection comprising a link having pivotal connection with the mold section and with the fixed point.

2. In a press of the character described, the combination of a pair of horizontally arranged annular mating mold sections of which the upper section has a relatively fixed situs, a power driven screw arranged coaxially of the mold and having rectilinear movement normal to the parting plane of the mold, the lower mold section being pivotally mounted to the upper end of said screw, whereby movement of the screw effects opening and closing of the mold, and means for tilting the lower mold section on its pivot as it approaches its lowermost position in the opening of the mold.

3. In a press of the character described, the combination of a pair of horizontally arranged annular mating mold sections of which the lower mold section has a relatively fixed situs, a power driven screw disposed coaxially of the mold and adapted for rectilinear movement in opposite directions, the upper mold section being pivotally mounted upon a diametric axis upon the lower end of said screw whereby the screw effects opening and closing of the press, and means for tilting the upper mold section during its rising movement as the press opens.

4. A combination as defined in claim 3 including fluid pressure operated means for imparting limited axial movement to the lower mold section, when the press is closed, to assure the perfect closing of the mold.

5. In a press of the character described, the combination of a pair of horizontally arranged annular mating mold sections of which the lower mold section has a relatively fixed situs, a pair of feed screws at diametrically opposite sides of the mold, said screws having reversible rectilinear movement, the upper mold section being pivotally supported on a diametric axis upon the upper ends of said screws, whereby the mold section is raised and lowered to open and close the press, means for operating said feed screws in unison, and means for tilting the upper mold section angularly upon its pivot as it approaches fully elevated position, said means comprising a telescopic link pivotally connected at one end to the said mold section and at its other end to a stationary part of the press.

6. In a press of the character described, the combination of a pair of superposed horizontally arranged mating mold sections pivoted on respective centrally disposed transverse axes that are parallel to each other, the axis of the upper mold section having a fixed situs, and a power member adapted to exert its entire force along an axis parallel to the axis of said mold for imparting movement in directions parallel to said axis, said power member disposed below the lower mold section and pivotally supporting the latter upon its upper end.

7. A combination as defined in claim 6, including means for tilting both mold sections to angular position with relation to the parting plane of the mold while the lower mold section is being lowered by the power member.

8. In a press of the character described, the combination of a pair of horizontally disposed annular mating mold sections, a nut having a fixed situs, power means for turning said nut, a screw threaded through said nut and moved axially by rotation thereof, said screw being disposed normal to the parting plane of the mold and pivotally connected directly to one of said mold sections upon the diametric axis of the latter, for raising and lowering said mold section, and means acting directly upon said movable mold section for tilting it upon its diametric axis in a determinate region of its movement.

9. In a press of the character described, the combination of a pair of horizontally disposed annular mating mold sections, a power driven screw member arranged parallel to the axis of the mold, one of said mold sections being pivotally mounted on a diametric axis upon an end of said screw member whereby movement of the latter effects opening and closing of the mold, and means for tilting said one of said mold sections on its pivot into oblique position during opening movement of the mold.

10. In a press of the character described, the combination of a pair of horizontally disposed annular mating mold sections, a power driven screw member arranged parallel to the axis of the mold, one of said mold sections being pivotally mounted on a diametric axis upon an end of said screw member, whereby movement of the latter effects opening and closing of the mold, means for tilting said one of said mold sections on its pivot into oblique position during opening movement of the mold, one of said mold sections being floatably supported on fluid pressure operated means for imparting limited axial movement to said mold section and for permitting said mold section to adjust itself to a uniform close fit with the other mold section.

RAYMOND W. ALLEN.